(12) United States Patent
Hill et al.

(10) Patent No.: US 7,729,976 B2
(45) Date of Patent: Jun. 1, 2010

(54) UNDERGROUND GAS STORAGE WITH SHORT TERM REVERSIBLE FLOW OPERABLE FOR USE IN ARBITRAGE/TRADING

(76) Inventors: Ross K. Hill, 14361 River Forest Dr., Houston, TX (US) 77079; Paul J. Grimes, 21714 Park York Dr., Katy, TX (US) 77450

( * ) Notice: Subject to any disclaimer, the term of this patent is extended or adjusted under 35 U.S.C. 154(b) by 1408 days.

(21) Appl. No.: 10/601,604

(22) Filed: Jun. 23, 2003

(65) Prior Publication Data

US 2004/0059692 A1 Mar. 25, 2004

Related U.S. Application Data

(63) Continuation-in-part of application No. 09/865,405, filed on May 25, 2001, now Pat. No. 6,581,618.

(51) Int. Cl.
*G06Q 40/00* (2006.01)
*B65G 5/00* (2006.01)
(52) U.S. Cl. .......................... 705/37; 405/53
(58) Field of Classification Search ............ 62/53.1, 62/45.1, 260; 405/53; 705/1, 37, 412, 8, 705/26; 137/1, 236.1
See application file for complete search history.

(56) References Cited

U.S. PATENT DOCUMENTS

| | | | | |
|---|---|---|---|---|
| 1,679,417 | A * | 8/1928 | Garnier | 417/28 |
| 2,550,844 | A * | 5/1951 | Meiller et al. | 48/190 |
| 3,407,606 | A * | 10/1968 | Khan et al. | 405/54 |
| 3,848,427 | A * | 11/1974 | Loofbourow | 62/260 |
| 3,986,339 | A * | 10/1976 | Janelid | 62/53.1 |
| 5,129,759 | A * | 7/1992 | Bishop | 405/59 |
| 5,431,482 | A * | 7/1995 | Russo | 299/4 |
| 5,511,905 | A * | 4/1996 | Bishop et al. | 405/59 |
| 6,298,671 | B1 * | 10/2001 | Kennelley et al. | 62/50.2 |
| 6,412,508 | B1 * | 7/2002 | Swann, Jr. | 137/1 |
| 6,517,286 | B1 * | 2/2003 | Latchem | 405/53 |
| 2003/0061820 | A1 * | 4/2003 | Bishop | 62/45.1 |
| 2004/0148249 | A1 * | 7/2004 | Kinnear | 705/37 |

\* cited by examiner

*Primary Examiner*—Igor Borissov
(74) *Attorney, Agent, or Firm*—The Matthews Firm

(57) ABSTRACT

A system and method are provided for short term trading in gas and/or gas derivatives. In a preferred embodiment, the system provides a plurality of shallow depth salt gas storage facilities. Each of the facilities is typically operated at pressures in a range close to the pipeline pressure, typically within a range of 20 to 80 bars. If trading results in a difference to be made up, then computers operating the facilities respond quickly to add or remove gas from the pipelines, as required, with a response time as low as two minutes to change the net direction of flow of gas into or out of the storage facilities.

8 Claims, 10 Drawing Sheets

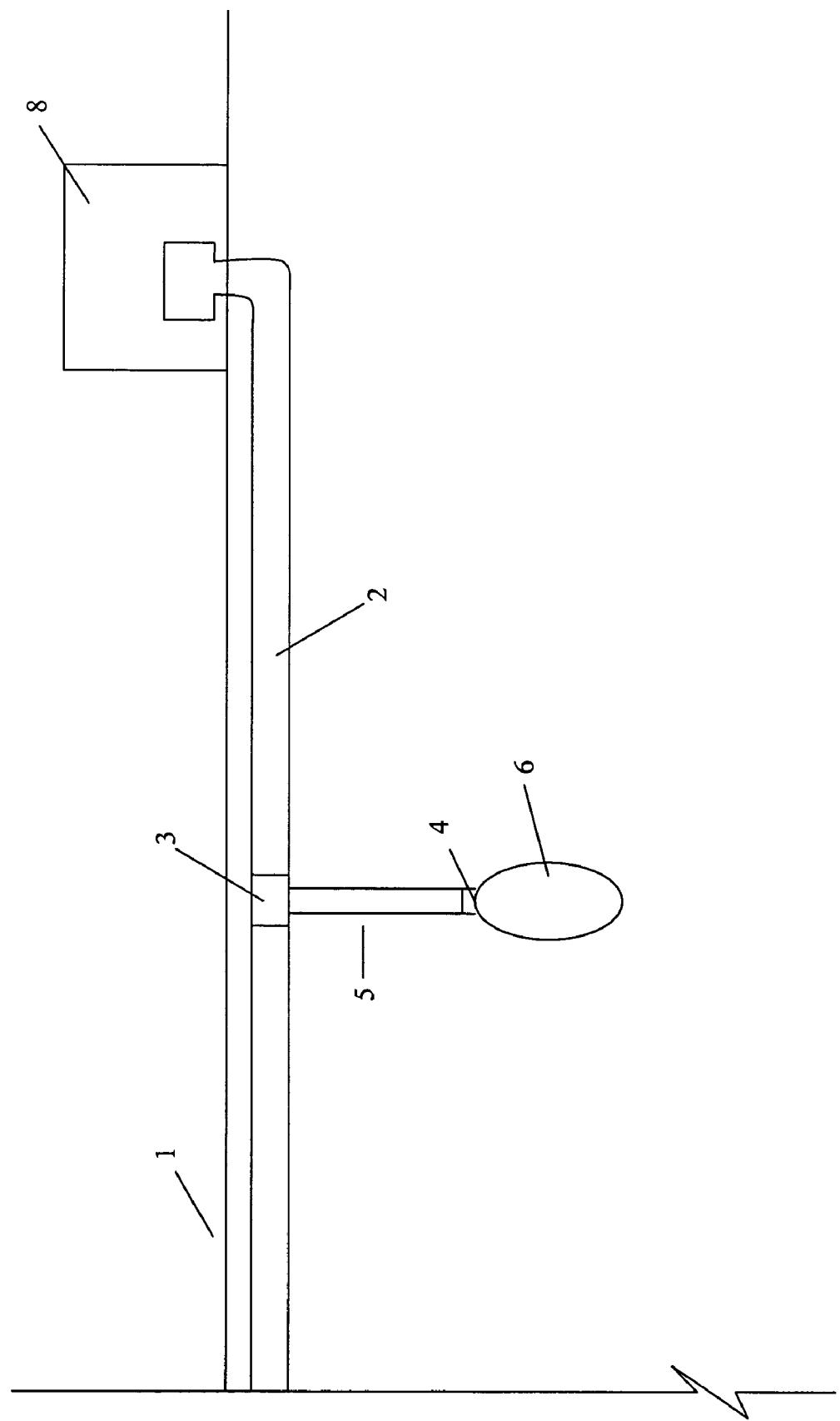

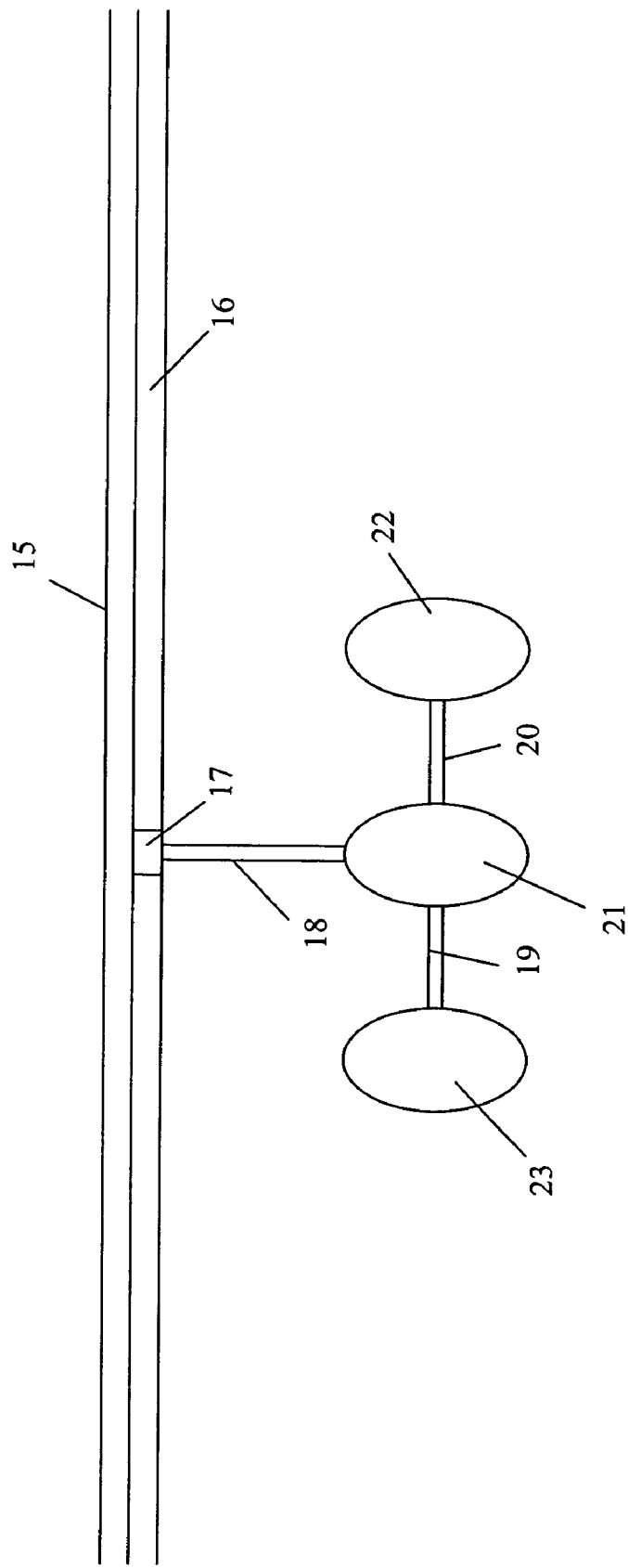

UNDERGROUND GAS STORAGE WITH SHORT TERM REVERSIBLE FLOW OPERABLE FOR USE IN ARBITRAGE/TRADING

RELATED APPLICATIONS

This is a continuation-in-part of U.S. application Ser. No. 09/865,405 filed May 25, 2001 now U.S. Pat. No. 6,581,618.

TECHNICAL FIELD

The present invention relates generally to short term trading related to natural gas, and more particularly to making trades related to gas and the means for making actual physical delivery or acceptance of gas on a short term basis as needed.

BACKGROUND ART

Natural gas, also known as methane, is a colorless, odorless, fuel that burns cleaner than many other traditional fossil fuels. As used herein, the term "gas" means and includes any gas, including natural gas. The term "diverted," pump," "pumped," "pumping," "compress," "compressing," "compressed," and the like shall mean channeling, compressing, and diverting. As used herein, the term "line" or "lines" shall mean and include pipes, lines, channels, and the like. It is one of the most popular forms of energy today. It is used for heating, cooling, production of electricity and it finds many uses in industry. Increasingly, natural gas is being used in combination with other fuels to improve their environmental performance and decrease pollution.

Natural gas is most commonly produced by drilling into the Earth's crust. A well or borehole is drilled into pockets of natural gas that have been trapped below the surface of the Earth. The natural gas is then compressed or piped to the Earth's surface. Once the gas is brought to the surface, it is refined to remove impurities, like water, other gasses, and sand. Then it is transmitted through large pipelines that span the continent and the world. In fact, natural gas has become a very important commodity.

Natural gas is supplied by many producers and utilized by many users. Factories and electric power plants may get gas directly from the pipeline using arrangements made through a marketer, supplier or producer. Residential and smaller businesses generally buy gas from a local distribution company or utility. Just like any other commodity, natural gas must be produced, sold and shipped to its end users. However, unlike other commodities, natural gas cannot be stored by the customer or by the producer in a warehouse until it is utilized. Because of the difficulty of storage, contracts of various types between producers, users, and third parties may be utilized to allocate the duties and costs and risks in the event of disruptions in either the supply or the demand. Disruptions may occur on a very short term basis. Various arrangements between the producers and users such as fixed prices, indexed prices, caps, take or pay arrangements, and the like may be utilized. In any event, a disruption will mean that one party or another may lose money if either a producer's supply is interrupted and/or a user's demand is interrupted. Many reasons for short term disruptions exist and may include plant maintenance or breakdowns, gas well problems, pipeline problems in one section of the pipeline, and the like.

One means for limiting risk, or profiting from such disruptions in supply and demand, involves trading in various contracts, derivatives, futures, storage rights, and the like related to gas. Generally, even in the short term, many purchasers and suppliers are available for this purpose, and assuming a price can be agreed upon, the supply and demand caused by the various disruptions can be matched. Thus, even in the short term, the interruptions on the supplier end will often be substantially equal to the disruptions on the demand end. In this case the buy and sells of the various contracts in gas can be matched. If the supply is roughly equal to the demand, then the gas prices tend to remain more stable. On the other hand, if the supply is not equal to the in the short term demand, then short term price fluctuations, and losses to one party or another, can be quite high. Moreover, if a trader takes a short term position he will typically not know what disruptions, either in the supply or demand, may occur in the future. Thus, it would be highly advantageous to the trader to know with high certainty that the capability for either accepting or producing large quantities of gas is ultimately available to avoid the likelihood of large losses by being on the wrong side of a trade.

Prior art gas storage facilities do not provide the required capability for either accepting or producing large quantities of gas in the time frames required for short term trading. For instance, the turn around costs of storing gas and retrieving gas are typically quite high in prior art gas storage facilities. For instance, turn around costs of inserting gas into and out of prior art underground storage requires large expenditures of energy/money for compressing, heating, cooling, and the like effectively making many short term turnarounds financially unfeasible. Some types of reservoirs are structurally damaged if alternately increasing/decreasing pressure cycle changes occur too frequently. There is also the problem of changing the equipment configuration including valves, compressors, and the like, to permit changing the direction of flow of the gas supplies. As well, there is the significant problem of pressure surges and drops, pressure waves, and the like produced in the pipeline system as a result of changing flow direction that may cause damage throughout the system. The minimum time for changing the direction of flow of gas for prior art utilities is at least one to two days, although as discussed above, frequent changes in gas flow directions for prior art gas storage facilities is economically unfeasible due to high turnaround costs and/or unfeasible due to potential damage to the facilities, including damage to the underground storage reservoir itself. In any event, a turn around time of one to two days for changing the direction of flow of gas into or out of the storage is too slow for use in short term trading, even assuming the other problems discussed above could be overcome.

Because of its gaseous nature and volatility, one of the most economically viable manners of storing natural gas is in specialized underground warehouses called natural gas storage fields. These storage fields consist of underground caverns, hollowed out salt domes, depleted natural gas and oil fields, or in some cases water-filled domes.

Underground storage, in common usage, is gas transferred from the reservoir of discovery to other reservoirs, usually closer to market areas, where it is stored until needed to meet market demand. Natural gas is stored in underground reservoirs primarily to ensure the capability of the gas industry to meet seasonal fluctuations in demand. Underground storage supplements the industry's production and delivery systems, allowing supply reliability during periods of heavy gas demand by residential and commercial consumers for space heating. Prior art storage facilities have utilized high pressure storage of natural gas to meet these demands.

These storage facilities/fields act as a buffer between the pipeline and the distribution system of the natural gas. Storage allows distribution companies to serve their customers more reliably by withdrawing more gas from storage to meet customer demands during peak use periods. It also allows the sale of fixed quantities of natural gas on the spot market during off-peak periods. Having local storage of gas also reduces the time necessary for a delivery system to respond to increased gas demand. Storage also allows continuous service, even when production or pipeline transportation services are interrupted. However, the time required to withdraw gas and the time required to re-fill these storage facilities is a source of great time, expense and danger to suppliers, consumers and the like.

For example, there are well more than 400 underground storage sites in 27 states across the United States and Canada. Together, these sites can hold upwards of 3 quads of natural gas, ready to be withdrawn at any time. (A quad is an abbreviation for a quadrillion (1,000,000,000,000,000) Btu. For natural gas, roughly equivalent to one trillion (1,000,000,000,000) cubic feet, or 1 Tcf.) Despite these high numbers, storage capacity is always increasing in order to accommodate increased gas usage and improve reliability. However, the underground storage of today is drastically limited in its operational uses and abilities.

The three principal types of underground storage sites used in the United States today are: (1) depleted reservoirs in oil and/or gas fields, (2) aquifers, and (3) salt formations. Each type has its own physical characteristics (porosity, permeability, retention capability) and economics (site preparation costs, deliverability rates, cycling capability), which govern its suitability to particular applications. As used herein, the term gas storage facility means and refers to any of the three principal types of underground storage sites, i.e. depleted reservoirs, aquifers, and salt formations.

Most existing gas storage in the United States is held in depleted natural gas or oil fields located close to consumption centers. Conversion of a field from production to storage duty takes advantage of existing wells, gathering systems, and pipeline connections. The geology and producing characteristics of a depleted field are also well known. However, choices of storage field location and performance are limited by the inventory of depleted fields in any region.

The reservoir rock of an underground storage cavern in which natural gas is normally stored consists of porous sandstone and limestone. It is quite common that these formations can contain 30% or more pore space by volume. In common cases, the gas is pressurized and injected into the storage reservoir as desired. Further, as desired, the injected natural gas may be produced from the storage reservoir when needed. Accordingly, the art field is in search of a method of utilizing depleted field storage facilities to obtain an utmost benefit.

In some areas natural aquifers have been converted to gas storage reservoirs. An aquifer is suitable for gas storage if the water-bearing sedimentary rock formation is overlaid with an impermeable cap rock. While the geology of aquifers is similar to depleted production fields, their use in gas storage usually requires base (cushion) gas and greater monitoring of withdrawal and injection performance. Deliverability rates of aquifers have been enhanced by the presence of an active water drive. However, the use of aquifers as natural gas storage is, like depleted fields, limited by the presence of an aquifer. Accordingly, the art field is in search of a method of utilizing aquifer storage facilities to obtain an utmost benefit.

Salt formation storage facilities provide very high withdrawal and injection rates compared with their working gas capacity. Base gas requirements are relatively low. To date, the large majority of salt cavern storage facilities have been developed in salt dome formations located in the Gulf Coast States. Salt caverns leached from bedded salt formations in Northeastern, Midwestern, and Western States are also being developed to take advantage of the high volume and flexible operations possible with a cavern facility. Accordingly, the art field is in search of a method of utilizing salt formation storage facilities to obtain an utmost benefit.

Additionally, storage facilities are classified as seasonal supply reservoirs (depleted gas/oil fields and aquifers for the most part) and high-deliverability sites (mostly salt cavern reservoirs). Seasonal supply sites are designed to be filled during the 214-day nonheating season (April through October) and drawn down during the 151-day heating season (November through March). High-deliverability sites are situated to provide a rapid drawdown (or rebuilding) of inventory to respond to such needs as volatile peaking demands, emergency backup, and/or system load balancing. However, prior art high-deliverability sites are drawn down in 20 days and refilled in 40 days, a relatively large period of time. Accordingly, the art field is in search of a method of utilizing a high-deliverability natural gas storage facility that may be cycled in about ten days. In this context, a cycle is the process of taking the gas cavern from minimum fill to maximum fill and back to minimum fill.

High deliverability may be achieved in a depleted oil or gas reservoir if the reservoir rock has high porosity and permeability (allowing a rapid flow of gas), and the reservoir has sufficient base gas pressure and a sufficient number of wells to maximize withdrawal. Additionally, it would be desirable to be able to refill a reservoir in a reasonably short time. Accordingly, salt cavern storage is ideal for high deliverability, as the entire cavern is one large pore. On average, salt storage facilities can withdraw their gas in about 20 days versus 71 days for aquifers and 64 days for all depleted oil or gas reservoirs. However, the time needed for re-fill is nearly twice that of drawing the natural gas.

Underground storage in depleted gas/oil fields is used when gas can be injected into reservoirs with suitable pore space, permeability, and retention characteristics. All oil and gas reservoirs share similar characteristics in that they are composed of rock with enough porosity so that hydrocarbons can accumulate in the pores in the rock, and they have a less permeable layer of rock above the hydrocarbon-bearing stratum. The hydrocarbon accumulation in the porous rock is pressurized by the weight of hundreds or thousands of feet of rock on top of the reservoir. When a well hole penetrates the impermeable cap layer of rock, the hydrocarbon under pressure is exposed to the much lower atmospheric pressure, and gas can flow into and out of the well.

Depleted oil and gas reservoirs are the most commonly used underground storage sites because of their wide availability. The depleted reservoirs use the pressure of the stored gas and, in some cases, water infiltration pressure to drive withdrawal operations. Cycling is relatively low, and daily deliverability rates are dependent on the degree of rock porosity and permeability, although the facilities are usually designed for one injection and withdrawal cycle per year. Accordingly, the art field is in search of a method by which the cycling may be increased.

Daily deliverability rates from depleted fields vary widely because of differences in the surface facilities (such as compressors), base gas levels, and the fluid flow characteristics of each reservoir. Retention capability, which is the degree to which stored gas is held within the reservoir area, however, is highest of the three principal types of underground storage.

In order to use an abandoned gas reservoir for storage, one or more of the wells used for extraction are typically used to inject gas. As with extraction, the more porous the rock, the rate of injection may be greater. As pressure builds up in the reservoir, the rate of injection slows down (pushing the gas in against higher pressure requires more force). Similarly, when the reservoir is at peak pressure, the rate of extraction is greater than at minimum pressure. Accordingly, the art field is in search of a method that does not encounter the difficulties of slow fill and slow draw.

The factors that determine whether a gas reservoir will make a good storage reservoir are both geographic and geologic. The greater the porosity of the rock, the faster the rates of injection and withdrawal. In some cases, where the reservoir rock is tight or of low porosity, then some form of stimulation of the reservoir may also be performed. This would include various methods to introduce cracks into the reservoir rock, thus increasing the opportunities for the hydrocarbon to flow towards the well hole.

The size of the reservoir (the thickness of the gas-bearing rock stratum and the extent to which the stratum is covered by cap rock) is another factor. Location is also a factor. If the reservoir is not close to existing pipelines or market areas and distribution lines, then greater expense will be incurred to establish connecting pipelines and less utility maybe derived. Accordingly, the art filed is in search of a method that utilizes reservoirs to obtain an utmost performance.

An aquifer storage site is a water-only reservoir conditioned to hold natural gas. Such sites are commonly used as storage reservoirs only when depleted gas or oil reservoirs are not available. Aquifers have been developed exclusively in market areas. In general, aquifer storage is more expensive to develop and maintain than depleted gas or oil reservoir storage.

Aquifer storage deliverability during the heating season is designed around specific customer requirements. These requirements may be for deliveries over a set period of time, for instance, 20, 60, or 120 days. The overall facility design reflects these combined requirements. These requirements also delimit the degree of cycling, that is, the number of times total working levels may be depleted and replenished during a heating season that may occur at an aquifer site. The sustained delivery rate cannot exceed design limits. Otherwise, unlike depleted oil and gas reservoir storage where cushion gas can be tapped when needed, tapping cushion gas in an aquifer storage site can have an adverse effect upon reservoir performance. Accordingly, the art field is in search of a method of utilizing an aquifer to obtain an utmost benefit.

Salt formations have several properties that make them ideal for storing natural gas. A salt cavern is virtually impermeable to gas and once formed, a salt reservoir's walls have the structural strength of steel. Thus, gas cannot easily escape the large hollowed-out shape that forms a salt storage cavern.

There are two basic types of salt formations used to store natural domes and beds. Salt domes are very thick salt formations. A salt dome formation might be a mile in diameter, 30,000 feet in height, and begin about 1,500 feet below the surface. The depth of the caverns that are hollowed out within the formation is critical for reasons of pressure and structural integrity. The pressure at which the gas can be stored is a function of the depth of the cavern. However, at extreme depths, as temperature and pressure increases, salt behaves as a plastic and will creep or flow, which can become a major consideration in cavern construction possibly leading to cavern closure. Thus, salt storage is generally limited to depths shallower than 6,000 feet. Accordingly, the art field is in search of a method of utilizing a low depth salt cavern to obtain an utmost benefit.

A salt bed storage site, on the other hand, is generally developed from a much thinner salt formation (less than 1,000 feet) located at shallower depths. As a result, the height-to-width ratio of the leached cavern is much less than with dome reservoirs, which are relatively high and narrow. Salt bed storage formations also contain much higher amounts of insoluble particles (shale and anhydrite rock) than salt dome formations. These materials remain in the reservoir after the leaching process and affect the flow velocity and capacity of the reservoir itself. In addition, because the height/width aspect is thin, the flatter reservoir ceiling is subject to greater stress and potential wall deterioration. As a result of these as well as other factors, salt bed storage development and operation can be more expensive than that of salt dome storage.

The term salt formation, as used herein, refers to both salt bed and salt dome storage facilities.

A salt formation storage facility is prepared by injecting water (leaching) into a salt formation and shaping a cavern. The deliverability rates of a salt formation are high because a salt formation reservoir is essentially a high-pressure storage vessel (that is, an underground tank). Base gas requirements are low (25 to 40 percent). On average, salt formation storage is capable of multiple cycling of inventory per year, in comparison to the typical one cycle or less for depleted gas/oil field and aquifer storage. As such, salt formation storage is well suited for meeting large swings in demand. However, prior art methods of utilizing salt formations have required using compressors to compress natural gas to high pressure within the storage facility. As a result, often expensive and time consuming compression, heating/cooling and energy costs have been required to use the storage facilities. Accordingly, the art field is in search of a method of use of a salt storage facility that obtains a maximum benefit of the salt formation storage facility.

Further, a salt cavern site occupies a much smaller area than an oil or gas reservoir. On average, the amount of acreage taken up by a depleted gas/oil field reservoir is more than a hundred times the amount of acreage taken up by a salt dome. Consequently, a salt cavern storage operation is generally easier to monitor than a gas/oil field reservoir operation made up of many wells. Development time is also much less for salt formation storage than for gas/oil field reservoirs. On average, it takes about 18 to 24 months to develop a salt reservoir while a gas/oil field reservoir takes 24 to 36 months. Thus, a new salt formation storage site may begin to pay off sooner than a gas/oil field reservoir. Accordingly, the art field is in search of a method of use of a salt storage facility to assist in maximizing a pay off of the developmental costs.

For the same working gas capacity, new salt formation storage reservoirs are also capable of yielding much greater revenues for a heating season than conventional gas/oil field reservoirs. However, present methods of use for salt formations are limited to generally about one turnover per season. A generally large percentage of the salt storage facilities exist in the southern states of the U.S, but because of the many benefits of a salt formation, plans are underway in the Midwest and northeast to develop such salt storage facilities. These facilities would augment directly the operations of nearby gas distribution companies. Accordingly, the art field is in search of a method of utilizing such salt formations to obtain a maximum benefit of the salt storage facility.

A most important characteristic of an underground storage reservoir is its capability to hold natural gas for future delivery. The measure of this is called working gas capacity: the amount of natural gas inventory that can be withdrawn to serve customer needs. In addition to working (top storage) gas, underground storage reservoirs also contain base (cushion) gas and, in the case of depleted oil and/or gas field reservoirs, native gas. Native gas is the gas that remains after economic production ceases and before conversion to use as a storage site. Upon development of a storage site, additional gas is injected and combined with any existing native gas in order to develop and maintain adequate storage reservoir pressure to meet required service. The resulting (permanent) inventory is referred to as the base or cushion load. During heavy demand periods, some base gas may be withdrawn temporarily and delivered as working gas, but over the long term, base levels must be maintained to ensure operational capability.

Natural gas is one of the most plentiful natural resources in North America and the reserves of the U.S. and Canada are enough to supply this continent well into the next century. However, the need for natural gas storage and violent supply swings arises because the demand for natural gas during the winter months exceeds the nation's production capacity, particularly in the Upper Midwest and Northeast. The U.S. consumes considerably more gas than it can produce during winter months because the interstate pipelines which transport natural gas from producing gas and storage fields in the Gulf Coast and the nations production regions to the market regions of the U.S. often do not have the capacity to transport the amount of natural gas needed during the peak demand periods, resulting in localized shortages of natural gas in the upper Midwest and Northeast U.S. Accordingly, the art field is in search of a method of transporting and storing natural gas that allows for a greater flexibility during peak demand periods and peak over supply periods.

Additionally, when the pipelines are loaded to their maximum capacity a bottleneck is formed in these pipelines as it is impossible to get additional gas into the pipelines until some of the gas has been consumed along the way. After some of the gas has been consumed, pipeline capacity opens up again and more gas can be placed into the system. Natural gas storage fields located to the north or downstream of this bottleneck have here-to-for been the only solution to this problem. Accordingly, the art field is in search of a method of utilizing natural gas storage for overcoming the bottleneck problems currently experienced by end consumers, suppliers and others.

As is common with natural gas, periods throughout the year are varying in regards to usage. During certain periods of the year usage may be higher than other periods of the same year. However, a gas pipeline only has a maximum capacity. Once the maximum capacity is reached in the pipeline, no more gas may be added to the pipeline. To further complicate matters, gas supply sources are commonly concentrated only in certain portions of an area. For instance, gas supply is most common in the southern portion of the U.S. Accordingly, the natural gas must be transported to other portions of a country or region to be used.

A major problem encountered with natural gas pipelines is when demand exceeds the supply of the pipeline. During the winter months of a year, natural gas will be depleted from the pipeline at a rapid pace in the Northern portions of a country where winter months require heating. The suppliers of natural gas can attempt to produce more gas to fill the pipeline, but this requires more time and effort. The prior art has tried to solve this problem with supplies from the depleted fields, aquifers and salt formations into the pipeline, but often it is not enough and there are severe shortages and price swings of natural gas. Accordingly, the art field has sought a system and method of use to balance the periods of high use and high supply by having alternate sources from which to divert natural gas (diverting natural gas, as used herein, means either filling or removing natural gas from a natural gas storage facility).

Likewise, prior art high pressure storage facilities require compressors to force natural gas into the natural gas storage facilities, especially as the high pressure storage facilities become approach capacity. These compressors require tremendous amounts of energy, thereby raising the costs of storage. Likewise, when releasing the high pressure gas from the high pressure natural gas storage facilities, the gas must be decompressed as the flow enters the pipeline, thereby, again, raising the cost of the natural gas storage and retrieval operations. Therefore, the constant adjustment to the pressure of the gas both into and out of high pressure natural gas storage facilities decreases the flow of the natural gas. A decrease in flow both into and out of the natural gas pipeline makes it extremely difficult to make quick changes in the flow of natural gas in a gas pipeline. Changes would occur much more quickly if the flow rates both into and out of the natural gas storage facility were maintained high. Accordingly, the art field is in search of a method of utilizing natural gas storage facilities in a manner that responds quickly to a change.

One prior art solution is disclosed in U.S. Pat. No. 4,858,640 to Kauffman. This patent discloses a network to be supplied by coordinating removal of gas from the individual storage caverns at an originally high storage pressure to a minimum residual pressure which is still below the operating pressure in the consumer network. This patent uses a system of valves and compressors to store high pressure gas in storage caverns. This patent does not disclose a relatively shallow depth storage cavern that may be used at a storage cavern operating pressure that is nominally the pressure of a pipeline. Accordingly, the art field is in search of a method of use whereby a relatively shallow depth and low pressures gas storage facility may be used with an existing network.

BRIEF DESCRIPTION OF DRAWINGS

For a further understanding of the nature and objects of the present invention, reference should be made to the following detailed description, taken in conjunction with the accompanying drawings, in which like elements are given the same or analogous reference numbers and wherein:

FIG. 1a is an illustration of an embodiment of the present invention utilizing a relatively shallow depth and low pressure gas storage facility.

FIG. 2 is an illustration of an embodiment of the present invention whereby multiple gas storage facilities are connected in series.

GENERAL AND DETAILED DESCRIPTION AND EMBODIMENTS FOR CARRYING OUT THE INVENTION

Figure 1B:
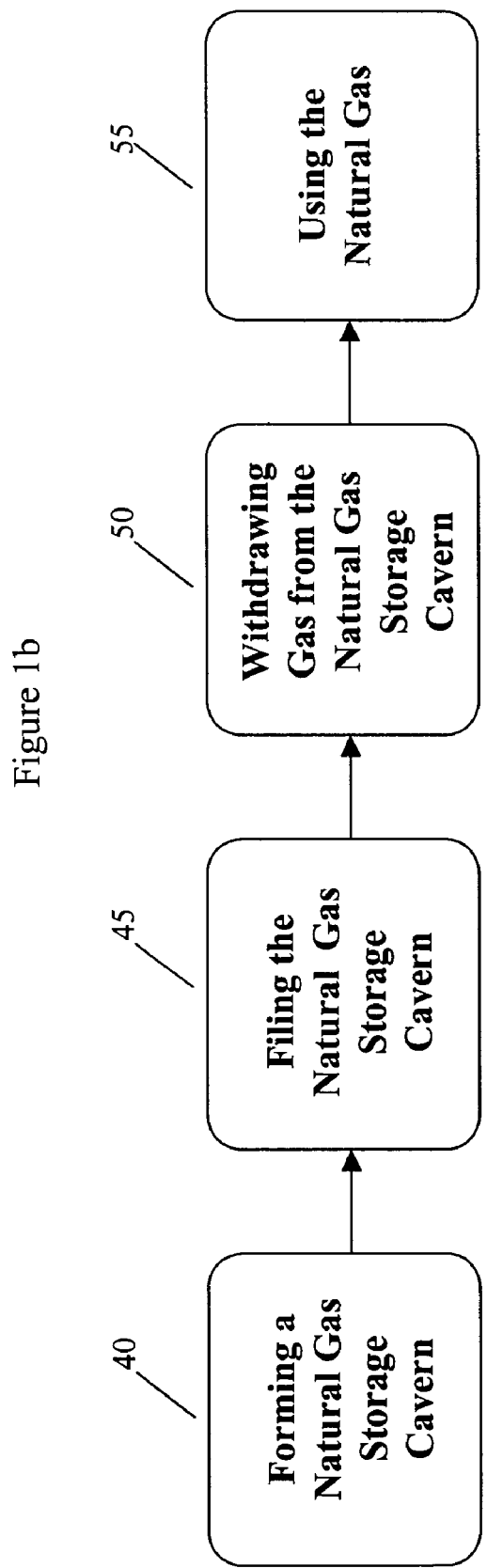
FIG. 1b is an illustration of a flowchart of an embodiment of a method of use of the present invention.

For purposes of the description of this invention, the terms "upper", "lower", "right", "left", "vertical", "horizontal", "top", "bottom", and other related terms shall be defined as to relation of embodiments of the present invention as it is shown an illustrated in the accompanying Figures. Further, for purposes of the description of this invention, the terms "upper portion," "lower portion," "top," "bottom," and the like shall be defined to mean an upper portion and a lower portion and not specific sections. However, it is to be understood that the invention may assume various alternative structures and processes and still be within the scope and meaning of this disclosure. Further, it is to be understood that any specific dimensions and/or physical characteristics related to the embodiments disclosed herein are capable of modification and alteration while still remaining within the scope of the present invention and are, therefore, not intended to be limiting.

As will be understood by those of ordinary skill in the art, the present invention provides a new and novel method of providing a natural gas to a pipeline and/or end user. Primary distinctions with this method over other methods in the art are that (1) embodiments of the present invention allow for very high flow rates both into and out of the shallow depth, low pressure natural gas storage cavern(s); (2) the flow rates can be equal both into and out of the cavern(s); (3) the shallow depth, low pressure gas storage cavern(s), computer configurable valves and compressors of the present invention allow for a rapid reversal of flow in a pipeline; (4) large pipe connection to pipeline system(s) allow for high flow rates in and out of the pipeline system(s); (5) coordination between many suppliers, storage facilities, and users throughout a network; (6) coordination with purchases and sales of gas; and (7) others as will be discussed in greater detail in the following detailed description.

Now referring to FIG. 1a, an illustration of an embodiment of the present invention utilizing a relatively shallow depth and low pressure gas storage facility, a single gas storage facility is illustrated. However, multiple caverns may be used and remain within the scope of the invention as will be more fully shown and explained with reference to FIGS. 2 and 3.

Surface 1 is illustrated as an upper surface with a pipeline 2 below surface 1. However, various other embodiments utilize a pipeline 2 that is above surface 1. As well, a body of water, such as a lake, pond, stream or sea, may be located bout pipeline 2 or above surface 1. Pipeline 2 may be a supply pipeline connected to a gas production facility (not shown). Various embodiments of the present invention incorporate an end user 8 connected to pipeline 2. Along pipeline 2 is a valve or joint 3 that is connected to a gas storage facility 6 by a path 5.

Gas storage facility 6 may be any storage facility or facilities common in the art, such as a depleted field, an aquifer, or a salt formation. As has been described herein, each different type of storage facility may be constructed by appropriate methods and manners that are common in the art. A gas storage facility or facilities of the present invention are characterized as shallow depth, low pressure gas storage facilities.

One or more gas storage facilities 6 may be connected to a pipeline 2 by any method or path 5 common in the art such as piping or holes in the formation. In an embodiment, gas storage facility 6 is connected by a pipe with a valve 4 along a portion of path 5 that can control the flow of a gas into and out of a gas storage facility 6. Various embodiments also incorporate a valve or joint 3 about a pipeline 2 to control the flow of gas into and out of a pipeline 2. In an embodiment, the pipe connection to pipeline 2 is through a valve 4 and path 5 that are as large as path 5 to allow for an increased flow rate both into and out of pipeline 2.

While gas storage facility 6 is illustrated below pipeline 2, an actual orientation may be different. In an embodiment, a gas storage facility 6 is located adjacent pipeline 2, such that gas storage facility 6 is connected to pipeline 2 via piping or other methods common in the art. In another embodiment, a gas storage facility 6 is located within 10 miles of pipeline 2 and is connected as herein described.

As well, various embodiments of the present invention incorporate a compressor with gas storage facility 6 to aid in compressing of the contents of either pipeline 2 or gas storage facility 6. A compressor may be connected at any location between a gas storage facility 6 and a pipeline 2. Still, further embodiments of the present invention may incorporate a heater, dryer or cooler between a gas storage facility 6 and a pipeline 2 to aid in drying, heating or cooling of gas either being diverted from a pipeline 2 or being diverted from a gas storage facility 6.

As can be shown from the illustration of FIG. 1, end user 8 or his agents may have access to pipeline 2 and/or storage rights within the gas storage facility, and/or rights the contents thereof. In an embodiment of the present invention, end user 8 and/or other operators may have control rights of valve or joint 3 to divert a gas to and from pipeline 2 and/or may have rights to request the facility operator to act on their behalf for this purpose. In another embodiment, an end user, gas trader, third party, or other parties may contract with a gas storage facility to divert a flow of a gas from or to pipeline 2 from gas storage facility 6.

Figure 9:
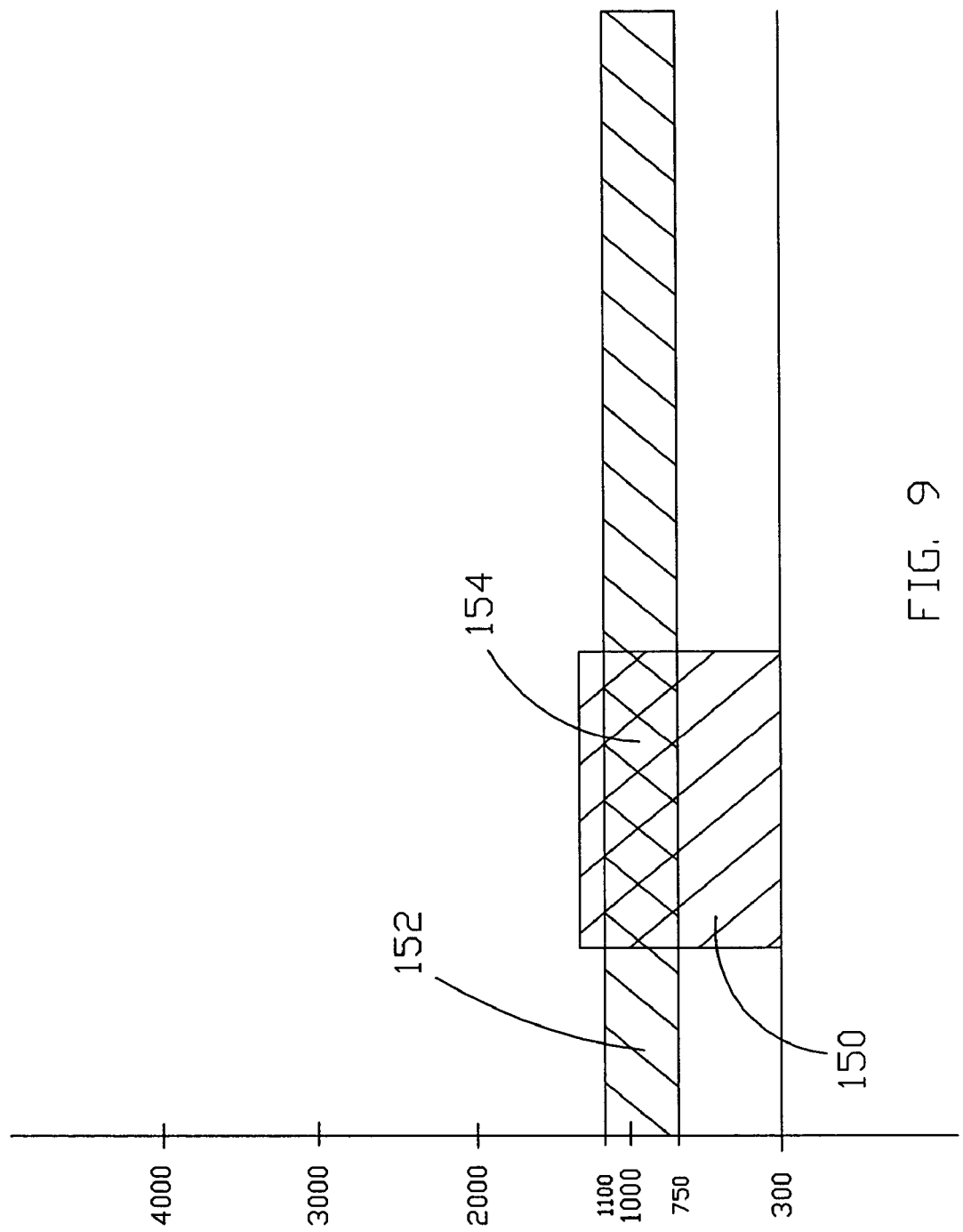
FIG. 9 is an illustration of a graph which shows the relative operating pressures for a standard gas pipeline as compared the pressures utilized within a gas storage system in accord with the present invention.

The present invention utilizes a gas storage facility 6 that has a portion at a depth of about 800 to about 1200 feet below a surface 1. Generally, a gas storage facility of the present invention may be categorized as having a top and a bottom, where the top is a portion of the gas storage facility closest to the surface of the earth and the bottom is a portion furthest from the surface of the earth. In one embodiment, a top of an underground gas storage facility of the present invention is at a depth of between about 600 feet to about 1000 feet and a bottom is at a depth of between about 1000 feet to about 2000 feet. In another embodiment a top is at a depth of between about 400 feet to about 1200 feet and a bottom is at a depth of between about 800 feet to about 2500 feet. However, the present invention envisions a gas storage facility or facilities with a top and a bottom at any depth. A pressure of a gas within a gas storage facility 6, at capacity, is preferably at or about the nominal pressure of a gas pipeline, as indicated in FIG. 9. Accordingly, a gas storage facility or facilities of the present invention may be referred to as a relatively shallow depth, and relatively low pressure gas storage facility.

Figure 3:
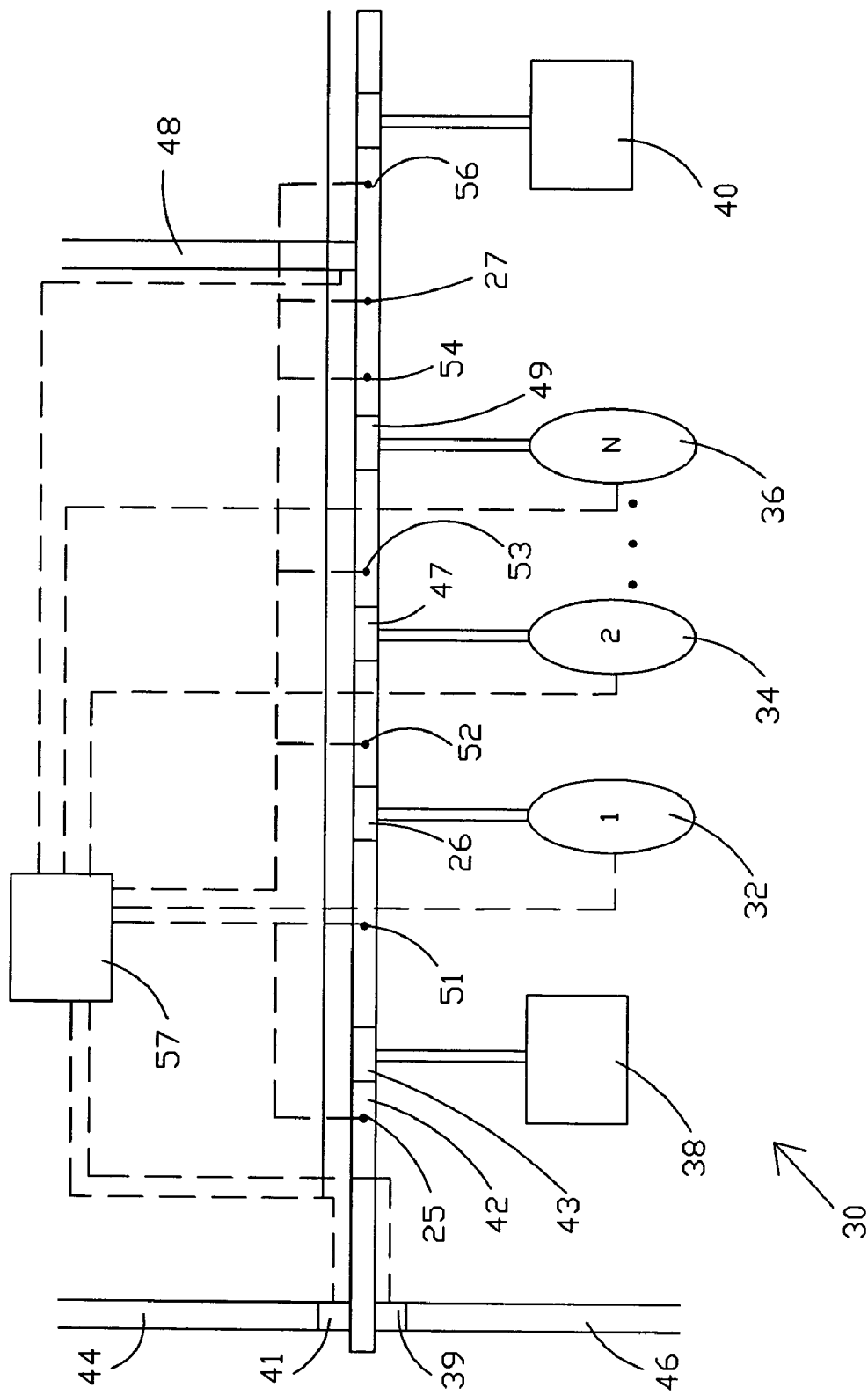
FIG. 3 is an illustration of an embodiment of the present invention whereby multiple gas storage facilities, users, and pipelines are interconnected, monitored, and/or controlled by computer.

Now referring to FIGS. 2 and 3, it may be seen that various embodiments of the present invention incorporate multiple gas storage caverns. In one embodiment, as can be seen from FIG. 2, multiple gas storage caverns are connected in series. In another embodiment, multiple gas storage facilities are connected in parallel.

In fact, various embodiments of the present invention incorporate the connection of any number of gas storage facilities, pipelines, suppliers, users, and computer controls to form network 30, as indicated in FIG. 3. For instance, storage facilities 32, 34, and 36 may comprise any number N of underground gas storage caverns and/or facilities. Users 38 and 40 may comprise one or more users distributed around network 30, but could comprise any number N of users. Additional pipes and associated valves may be connected to pipe 42 such as pipes 44, 46, and 48. Likewise sensors and controls such as pressure/valve sensors 25, 27, 51, 52, 53, 54, 56 may be utilized to monitor pipe conditions. Computer or computer system 57 may be utilized to control network 30 including operating the valves, monitoring pressure sensors, controlling storage facilities and the like. Computer system 57 may comprise a single computer or numerous computers and may typically comprise numerous computers distributed throughout network 30 and preferably linked together. Likewise, various other embodiments include the connection of multiple gas storage facilities in a combination or multiple combinations of series and parallel connections of gas storage facilities of the present invention. During opening and closing the various valves in the system, such as valves 26, 39, 41, 43, 47, 49, and the like, computer system 57 provides suitable controls so that the line pressures of the gas pipes remain within normal operating ranges, impulses and waves throughout the pipelines are avoided, and prevents other problems may occur that could cause damage throughout network 30. Thus, in accord with the present invention, computer control is utilized to coordinate opening and closing of valves and/or changes of gas flow direction into and/or out of the N number of gas storage facilities.

Figure 4:
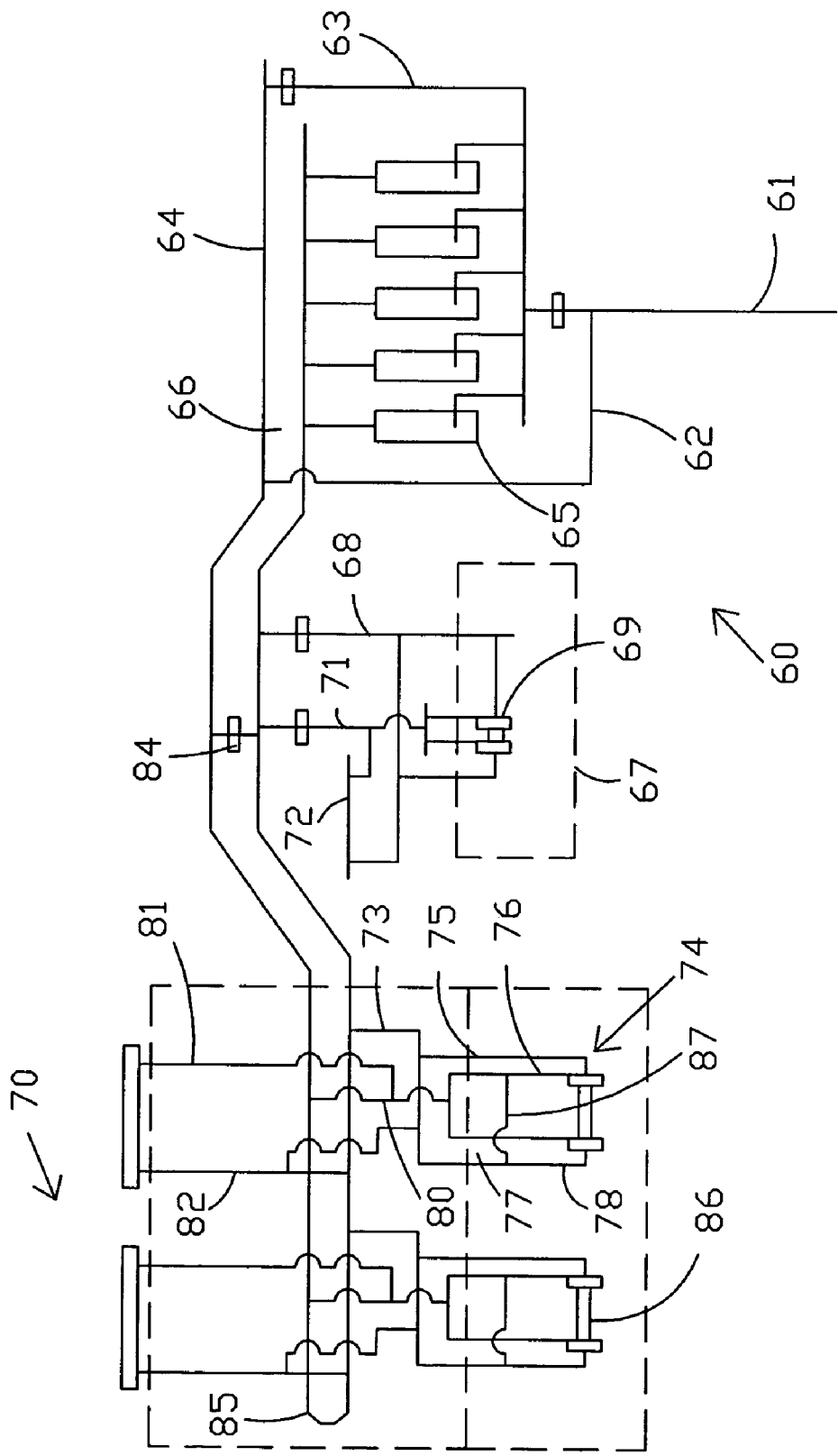
FIG. 4 is an illustration of an alternate embodiment of the present invention in an embodiment of a gas storage facility.

Now referring to FIG. 4, an illustration of an alternate embodiment of the present invention in an embodiment of a gas storage facility, a system 60 for use of and/or with various embodiments of the present invention is disclosed. Gas may be diverted by a compressor from a storage facility or facilities along a line 61. The gas compressed may be diverted to a gas pipeline 64 by lines 62 or line 63. In other embodiments, the gas compressed may be treated in treatment stations 65. The treatment may be any treatment common in the art, such as drying, heating, cooling, and the like. As in all embodiments of the present invention, various embodiments incorporate the use a connection to pipeline 64 that is very large, as previously described, to allow for high flow rates both into and out of pipeline 64.

The treated gas may then be passed in line 66 to compressor station 70. In various embodiments, a pre-compressor station 67 may be used. In embodiments utilizing a pre-compressor station 67, a portion of the gas or all of the gas may be diverted along a line 68 to compressor 69. Compressor 69 may be any pump and/or compressor common in the art, such as a single side or a dual side compressor. In an embodiment, compressor 69 is a MOPICO gas compressor with multiple modes, such as series, parallel, and/or the like, the operation of which will be discussed more fully below. However, any pump/compressor common in the art may be used. Pre-compressor station 67 may be used to increase the pressure, compression, flow, volume and/or the like of the gas before diverting it to compressor station 70. After treatment in pre-compressor station 67, the gas is diverted in line 71 back to line 66 where it may be diverted along line 84 or turnaround 85 to line 64 to a gas pipeline.

Other embodiments divert the gas to compressor station 70. Compressor station may incorporate any number of compressors 74. In the embodiment illustrated, two (2) compressors are illustrated, compressors 74 and 86. For ease of description, reference will be directed to compressor 74 and its operation. However, various other embodiments may utilize other similar compressors or different compressors. Referring back to compressor station 70 and compressor 74, the gas may be diverted along line 73 to compressor 74.

Compressor 74 may be operated in a variety of modes. Compressor 74 is at least capable of operating in a series mode and a parallel mode. However, other modes common in the art may be utilized. A series configuration may be utilized when a high pressure of gas is required. A parallel configuration may be utilized when a high rate of flow is desired. Both sides of various embodiments of compressors of various embodiments of the present invention are capable of pumping/compressing a gas. An example of a compressor that is capable of use with both sides is a MOPICO compressor.

In a series configuration, gas may be diverted from line 73 to line 75 and into a right side of compressor 74. After the gas is compressed/pumped on right side of compressor 74, the gas may be diverted out line 76 to line 87. Line 87 may divert the gas to line 78 and into left side of compressor 74. After pumping/compressing, the gas may be diverted along line 77 to line 64 and to a gas pipeline. The use of compressor 74 in a series configuration will increase the pressure of the gas twice. Other embodiments may use more compressors arranged in series to increase the pressure of the portion of gas passed through compressor 74 or other portions of gas.

In another embodiment, compressor 74 may be configured in a parallel arrangement. In a parallel configuration, the gas may be diverted from line 66 to line 73 and into both line 75 and line 78. In this configuration, both right and left side of compressor 74 will compressor different portions of gas to line 76 and line 77 thereby increasing the volume of gas diverted to line 80 and to line 64 and a gas pipeline. Other embodiments may use more compressors arranged in parallel to increase the volume of the portion of gas passed through compressor 74 or other portions of gas.

Figure 5:
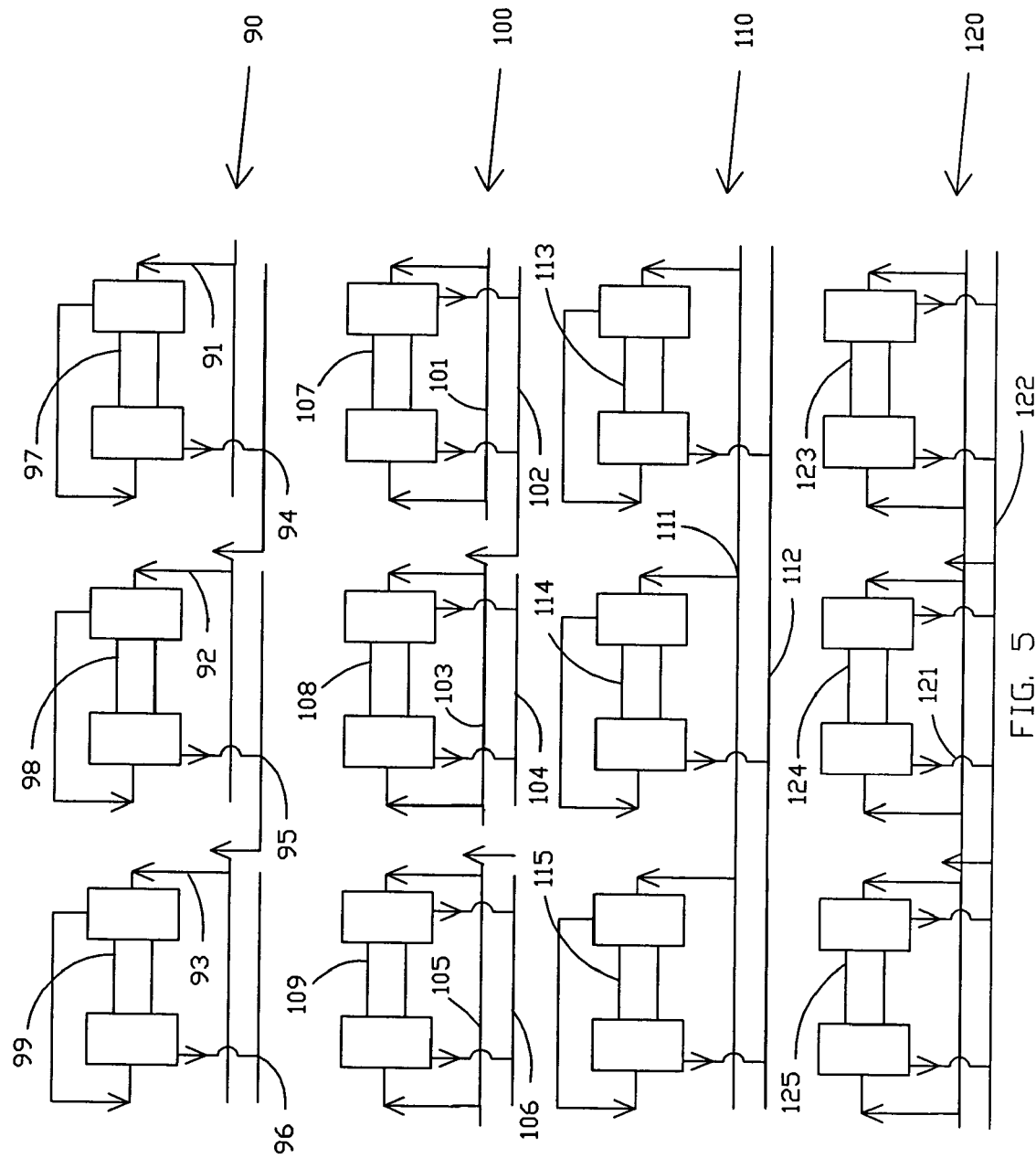
FIG. 5 is an illustration of an embodiment of an operation of multiple compressors in varying modes of operation of the present invention.

Now referring to FIG. 5, an illustration of an embodiment of an operation of multiple compressors in varying modes of operation of the present invention, various modes of multiple compressors are illustrated. In one embodiment with multiple compressors 90, each compressor may be operated in a series configuration. The overall result of the series configuration is maximum gas compression. Thus, gas in line 91 may be compressed in series by both compressors of dual compressor 97. Thus, the gas is compressed twice per dual compressor 97 and each subsequent dual compression. The twice compressed gas then proceeds in series, to line 94, to line 92 for compression in series by both compressors of dual compressor 98. Gas exiting compressor 98 may be diverted to line 95, to line 93 and to compressor 99; in series, and out line 96. In this embodiment, a maximum pressure may be obtained because the use of a gas supply and multiple compressors in a series configuration and a gas supply in series before diversion to a gas pipeline.

In another embodiment as indicated at 100, each compressor may be operated in a parallel configuration with a gas supply. This configuration provides increased gas flow rates but less overall compression. Gas in line 101 may be diverted to compressor 107; in parallel, to line 102, to line 103 and to compressor 108; in parallel. Gas exiting compressor 108 may be diverted to line 104, to line 105, and to compressor 109; in parallel, and out line 106. In this embodiment, an increased pressure and volume may be obtained from the use of compressors in parallel and a gas supply line to each compressor in series before diversion to a gas pipeline.

In another embodiment as indicated at 110, each compressor may be operated in a series configuration with one gas supply 111. Gas supply 111 may be diverted to compressor 113; in series, compressor 114; in series, and compressor 115;

in series and each individually out to line 112. In this embodiment, the pressure of the gas supply may be increased before diversion to a gas pipeline.

In another embodiment as indicated at 120, each compressor may be operated 120 in parallel with one gas supply 121. This configuration provides maximum gas flow rates and minimum compression. Gas supply 121 may be diverted to compressor 123; in parallel, compressor 124; in parallel; and compressor 125; in parallel out to line 122. In this embodiment, a maximum volume of gas may be compressed and diverted to a gas pipeline. However, various other modifications and arrangements, including the number of compressors, may be used and will be readily apparent to those of ordinary skill in the art.

Figure 7:
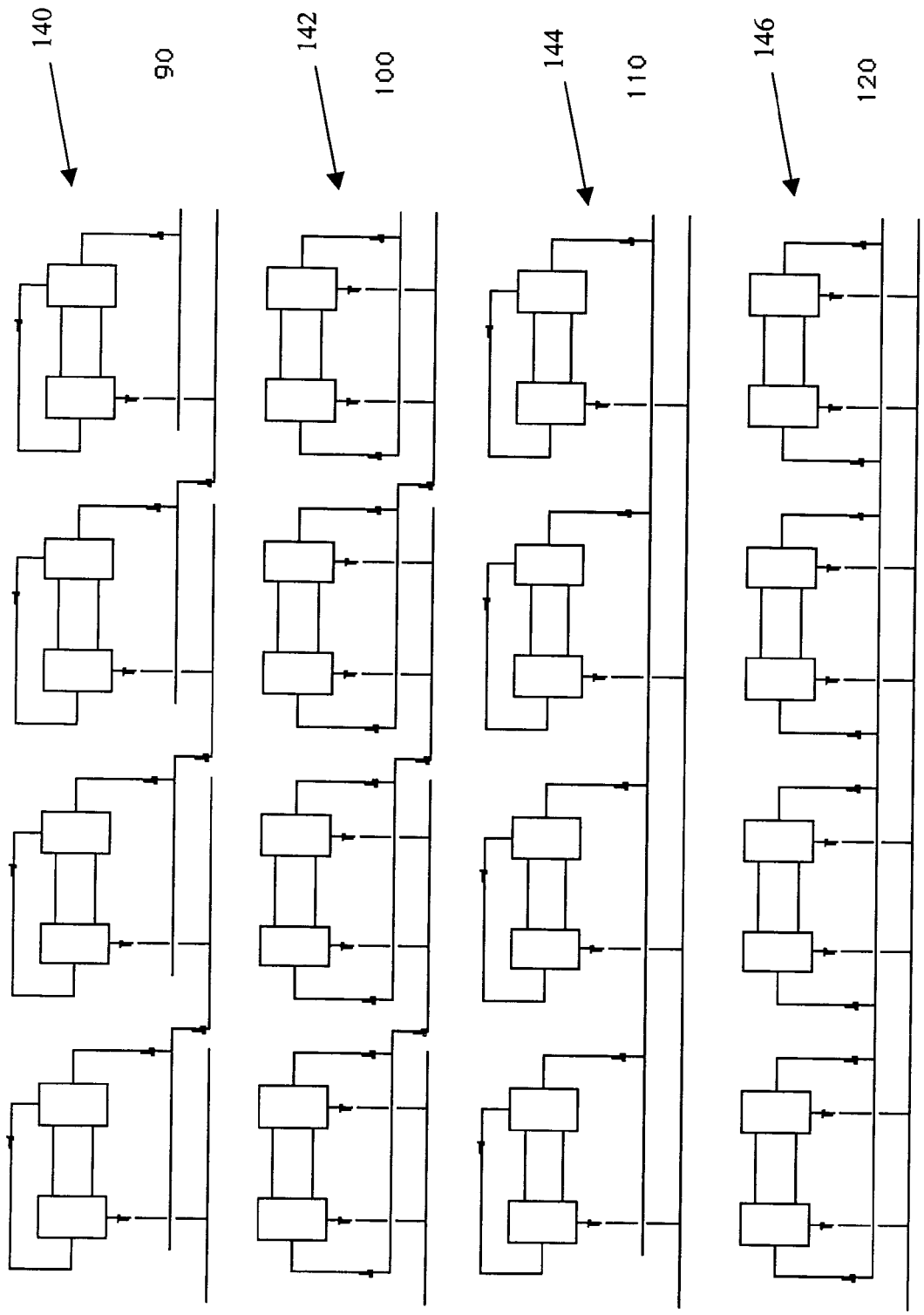
FIG. 7 is an illustration of an embodiment of an operation of multiple compressors in varying modes of operation of the present invention with four compressors.

Now referring to FIG. 7, an illustration of an alternate embodiment of the present invention in an embodiment of a gas storage facility with four compressors, the many modifications and alterations of the present invention may become apparent. Further, it may also be seen that various embodiments of the present invention can operate with any number of compressors depending upon the operator's choice. Process 140 is four compressors connected in series and pumping in series for maximum pressure. Process 142 is four compressors connected in series and pumping in parallel. Process 144 is four compressors connected in parallel and pumping in series. Process 146 is four compressors connected in parallel and pumping in parallel.

Figure 6:
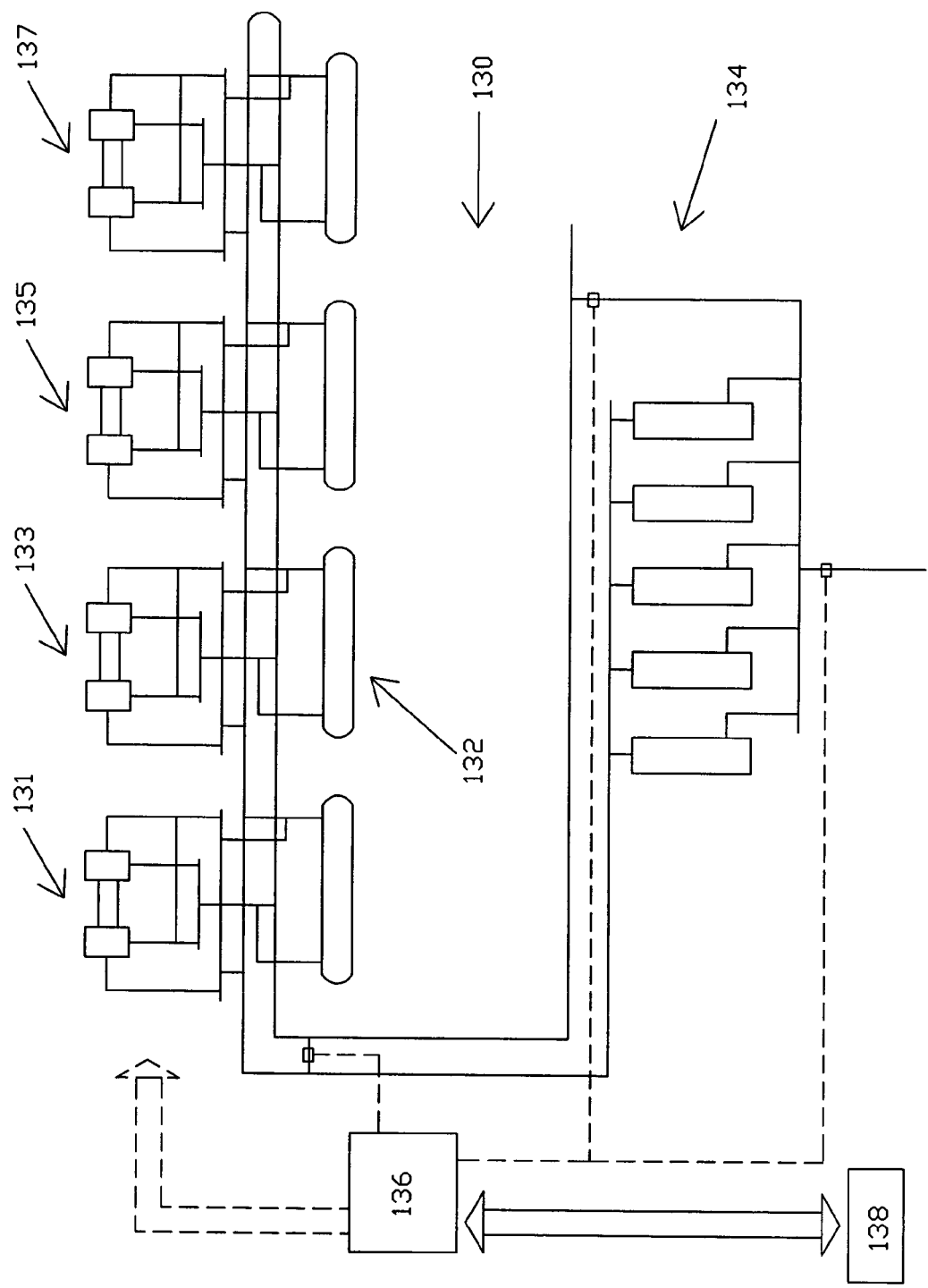
FIG. 6 is an illustration of an alternate embodiment of the present invention in an embodiment of a gas storage facility with four compressors.

Now referring to FIG. 6, an illustration of an alternate embodiment of the present invention in an embodiment of a gas storage facility with four compressors, the many and varying configurations of the present invention may be realized. The four compressors 131, 133, 135, and 137 shown herein may be configured in the manners described in detail in FIG. 4, FIG. 5 and FIG. 7. Computer control 136 may be utilized to automatically configure compressors 131-137 as desired. Computer control 136 may comprise one or more computers and may be part of computer system 57 discussed hereinbefore. Generally, the flow rates, reservoir pressures, pipeline pressures, and the like will be available so that computer 136 automatically configures compressors 131-137 for optimum flow rates into or out of the reservoir. Computer 136 controls the valves associated with each of the compressors to control the configuration by means of valve actuators that are computer controllable. As well, other valves in the installation can be monitored as to position, flow rates, and so forth. Computer 136 may be responsive to signals from other computers such as computer 57 for controlling the gas network. This embodiment of compressor station 130 has a treatment station 134 and a compressor station 132. However, various embodiments, as in this embodiment, do not include a pre-compressor station. As well, it may be seen that a varying number of compressors may be used in different embodiments depending upon the amount of compression, volume, and/or the like as needed.

Figure 8:
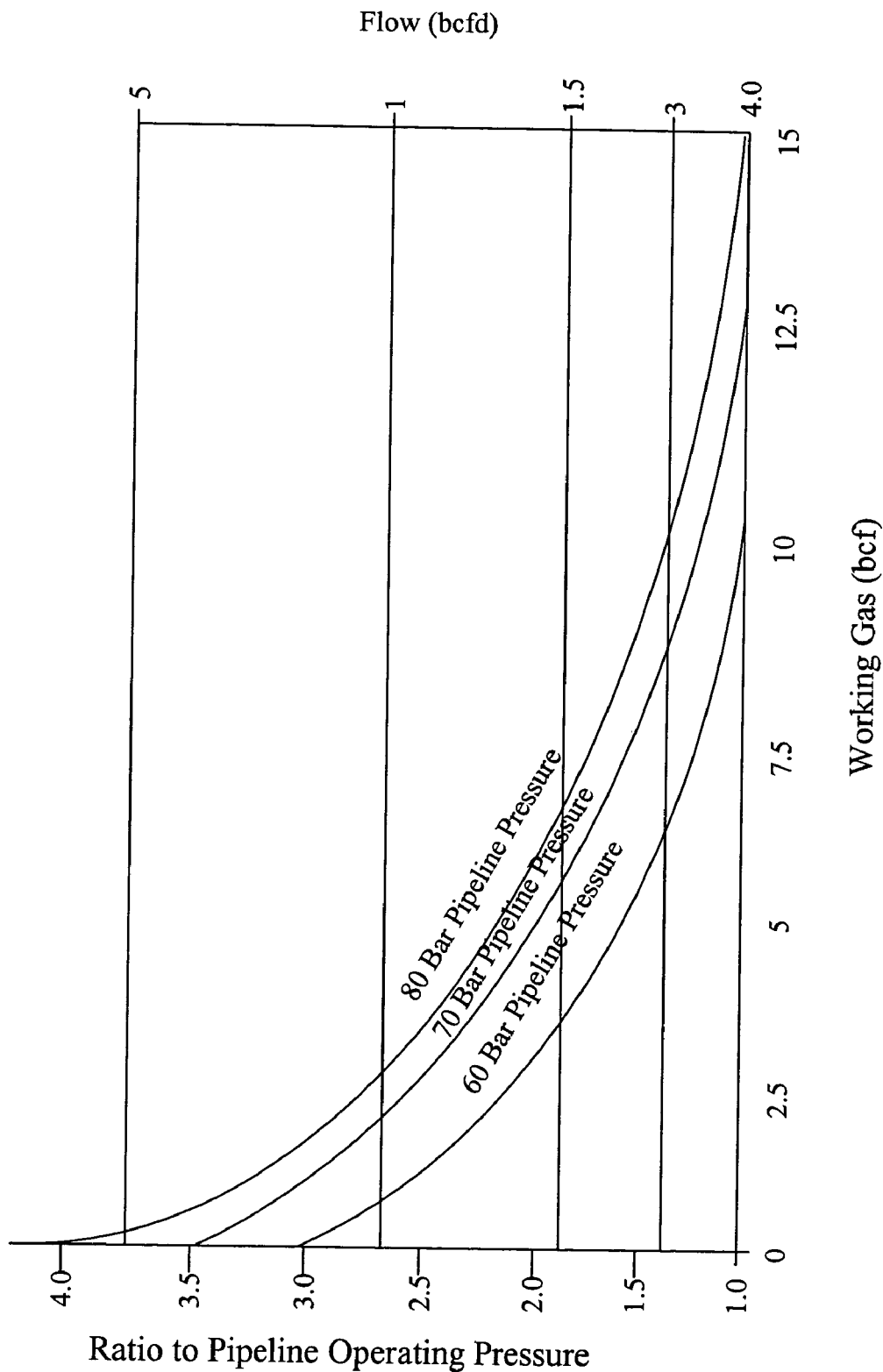
FIG. 8 is an illustration of a graph of ratios of pressure compared to a pipeline and flow of the gas to a volume of gas.

Now referring to FIG. 8, an illustration of a graph of ratios of pressure compared to a pipeline and flow of the gas to a volume of gas, the various improvements of various embodiments and methods of the present invention may be seen. FIG. 8 illustrates that as the flow is increased from a gas storage facility or facilities, through a compressing configuration as heretofore described, a maximum volume of working gas may be diverted to a gas pipeline from a gas storage facility or facilities. As well, FIG. 6 illustrates that as the pressure of gas diverted from a gas storage facility is increased above about the nominal operating pressure of a gas pipeline, the volume of gas diverted from the gas storage facility or facilities is decreased. Thus, maximum flow rates are achieved when the pressures are relatively close to the pipeline pressures.

In FIG. 9, the pressure ranges of a low pressure underground gas storage facility are indicated generally at 150 as compared to the operating range of standard pipelines. Thus, the pressures 150 may range from about 20 (approx 300 psi) to about 85 bar (approx 1200 psi) as compared to pipelines which may typically operate at about 50 to 80 bar. In this way, the injection and withdrawal rates are much higher than those for deep storage facilities. For instance, injection rates may be ten to fifteen times higher without requiring excessive compression facilities or reheating. The time to change flow directions may be about two minutes or less. The costs of injecting and removing gas are less than 25%, and may typically be about 20%, of the costs in deeper facilities. For instance with a cavern at 5,000 ft, the operating pressure range may be about 100-300 bar or more. The cavern has to be operated between minimum pressure differentials (0.4 psi/ft) to avoid cavern shrinkage and maximum pressure differentials (0.9 psi/ft) to avoid risk of fissures. Enormous amounts of compression and rigorous operating regimes are required. In addition, the removal of gas from deeper facilities is technically complex and requires substantial re-heating and hydrate prevention.

The possibility of trading in gas such as arbitrage trading, or other types of trading, is quite practical with the system of the present invention. The high rates of injection and low round trip costs of inserting and removing gas should allow traders having access or rights to at least a portion of a storage facility and system as discussed herein are believed to have a significant competitive advantage. To be able to have buy and sell bids out at all times for sizeable quantities (100 mmcf/d or more) secure in the knowledge that the actual physical gas can be supplied or removed without having to match with other buyers/sellers may result in making the facility owners main de factor market makers. The trading may be accomplished in any suitable markets, such as the futures markets, using any suitable vehicles such as options, futures, contracts, and the like. Thus, after the buy and sell bids have been matched by any means such as the overall market, or by localized means such as by computer system 57 or other computer systems or markets, which may also comprise one or more trading computers, or a plurality of trading computes or a network of trading computers, then network 30 may be utilized to add or remove gas as necessary. The particular owner of the rights to gas storage in the gas storage may have only a few trades outstanding or may comprise a major market maker. In any case, the particular owner's trades will be affected by the matching of buy and sell bids so that to the extent necessary, the owner to rights to gas storage will have the option of being able to provide supply or demand as necessary to effect a matching of real physical assets rather than simply contractual rights. Computer system 57 may be utilized to control the flow of gas into and out of the storage facilities. In some cases, the existing flow rates may simply be increased or decreased such that the overall flow rate through the pipelines remains in the desired range with the desired pressures. If necessary, the present invention permits rapidly changing large flow rates from into or out of one or more gas storage facilities. Computer system 57, which may comprise a plurality of computers, may be programmed to provide the changes in the least expensive means while protecting the network from surges, excessively high or low pressures, and the like.

Now referring to FIG. 1b, an illustration of a flowchart of an embodiment of a method of use of the present invention, the general concepts of the present invention may be more easily seen. Generally, various embodiments of the present invention incorporate the forming and connection of a gas storage facility to a gas pipeline 40; a filling of a gas storage facility 45; a withdrawal of gas from a gas storage facility 50; and using a gas from a gas storage facility 55. However, the various steps recited herein above are not sequential and may occur in any variety of orders and arrangements. Moreover, various embodiments of the present invention may be used for the treatment of a gas for any variety of reasons, such as adjusting the specification of the gas to meet an end users requirement, compressing a gas, storing a gas, and/ors the like.

Generally, as an overview, an embodiment of the present invention incorporates the use of shallow depth, low pressure gas storage facility in connection with a pipeline. The facility acts as a repository or storage vessel for a gas. The gas storage facility or facilities may be at least a portion filled with gas or may be at least a portion empty of gas.

In one embodiment of a method of utilizing a shallow depth, low pressure gas storage facility or facilities is when demand is high and gas usage may begin to deplete a supply of gas in a pipeline. Gas may be diverted from a shallow depth, low pressure gas storage facility or facilities into the pipeline to build pressure build volume or line pack for expected heavy uses. In one embodiment, a user would open a valve or line from a pipeline to a shallow depth, low pressure gas storage facility and, if a pressure of the gas in the pipeline is below the pressure of the storage facility, the gas would flow from the gas storage facility at a high rate until the pressure of the pipeline was about equal to the pressure of the gas storage facility. Other embodiments incorporate a compressor along a portion of the connection between the facility and the pipeline to force gas into the pipeline for use as a line pack.

Other embodiments of the present invention incorporate a user contracting with a third party storage facility to store or supply gas from the gas storage facilities or facility as needed. As discussed above, in the various embodiments of a third party controlling the gas storage facilities, the facility or facilities may be used as a trading tool, a form of trade or currency exchange such as an arbitrage, a direct gas feed from a storage facility to a user without passage through a pipeline, and other methods and manners of use common in the art.

In another embodiment, when supply is high in a gas pipeline and/or when a bottleneck may result in a portion of a pipeline and the like, gas may be diverted into the gas storage facility or facilities from the pipeline for a later use. This becomes extremely valuable to a user who has purchased a certain quantity of gas but is unable to use all of it. Instead of leaving the gas on the pipeline, the user may divert the gas to a gas storage facility or facilities for a later use, thereby storing the gas that the user may have already purchased and not wasting the gas by leaving the gas on the pipeline.

An embodiment of a shallow depth, low pressure gas storage facility of the present invention has a high flow rate of the gas both into and out of the gas storage facility because the gas storage facilities are at a shallow depth and a low pressure no external compression of the gas is required to fill the storage facility (the storage facility is at a nominal operating pressure of a gas pipeline). High flow rates allow users of a shallow depth, low pressure gas storage facility or facilities to make many changes and adjustments to the flow of a gas in a gas pipeline. In one embodiment, a user may make a decision to divert gas from a pipeline and into a shallow depth, low pressure gas storage facility As well, high pressure gas storage caverns, i.e. gas storage facilities at pressures that are far above the operating pressure of the gas pipeline, require added expense before using the gas because compressed gas generates heat and cooling depending on the direction of flow, thereby requiring the use of heaters and coolers to adjust the temperature of the gas prior to use. Therefore, the use of high pressure gas storage caverns has many disadvantages that increase the cost of the gas storage and retrieval operation. Accordingly, the art field has searched for a method of utilizing a storage facility whereby an overall cost of storing the gas and retrieving the gas is reduced.

Utilization of a shallow depth, low pressure gas storage facility allows for high flow rates both into and out of the gas storage facility or facilities because the gas may not need to be compressed and/or the compression if required will be less than the compression required of a high pressure gas storage cavern. Pressures of the gas storage facility or facilities of the present invention are about at nominal pipeline operating pressures. Operating a gas storage facility or facilities at shallow depth and at about nominal pipeline operating pressures may be about 1000 pounds per square inch. Other embodiments may use varying pressures.

One embodiment of use for a shallow depth, low pressure gas storage facility or facilities is in controlling gas inventories. End users are often required to purchase certain quantities of gas for a specified time or period, sometimes referred to as a take or pay system. At times when actual usage of the gas is less than the amount of gas purchased this results in excess gas remaining on the pipeline and the end user being required to pay for more gas than was required for that period. In an embodiment of the present invention, in a gas storage facilities or a facility, a user may divert a portion of gas on a pipeline to a gas storage facility or facilities, thereby storing the gas already purchased and not wasting the gas or leaving the gas on the pipeline.

Another common problem encountered with gas pipelines is that there is often not enough gas on the pipeline to supply the end users, requiring them to pay excessive prices to have extra gas compressed on the pipeline from extra or excess supply from other sources. In an embodiment of the present invention, end users could release gas from a gas storage cavern to supplement the supply of gas on the pipeline. In another embodiment, a gas storage facility may directly divert the gas to the user from a gas storage facility.

A gas storage facility or facilities of the present invention are particular efficient for use with balancing operations which may be required in any increment of time or continuous as regulations require. Balancing operations are operations to match the physical and contractual requirements to the input or delivered gas in the pipeline system. In an embodiment of the present invention, a pipeline operator or controller may divert a gas from or to a gas storage facility or facilities to balance the pipeline. Various embodiments of balancing the gas pipeline may include both the addition of gas from the gas storage facility or facilities and/or withdraw or removal of gas from the gas pipeline.

Other embodiments of the present invention may use a gas storage facility as a hub or central repository. Low pressure high volume storage can be used to create a gas trading hub because it has the physical ability to handle large movements of gas in & out of storage, and to create a physical balancing point for a natural gas system. Further, low pressure high volume storage also has the ability to create a contractual point at which gas trades, puts, calls, transportation commitments and other contracts, can be reconciled. In the prior art the Hub concept has been primarily a point where various pipelines have been aggregated, the new invention replaces this multiple pipeline aggregation point with a hub having many more capabilities, including all applications as disclosed herein.

Other embodiments of the present invention may use a gas storage facility that is located on or near the physical location of the user, or which is directly connected to a user. In one embodiment, a gas storage facility may be used as a supply of gas directly to a facility such as a power generation plant, manufacturing process, a liquid natural gas (LNG) facility, and/or the like. As well and/or in addition, a gas storage facility or facilities of the present invention may be used for start-up operations after a shut down. The gas storage facility or facilities would supply pipeline operating pressure gas at a high flow rate for a sufficient period of time for startup. The amount of gas required for startup could be computed and an appropriate number and size of shallow depth, low pressure storage caverns of the present invention can be constructed. After starting the user's facility, the supply may be switched to a gas pipeline. The formation of the facility(s) can be customized to each user's requirements.

Gas storage facility(s) of the present invention may be used with LNG storage facility(s) to improve the economics of the LNG facility. LNG facilities are common in the art and it is known that a majority of LNG facilities require refrigeration and/or cost of compression. In various embodiments, a gas storage facility(s) of the present invention may be used for storage of LNG and/or its expanded state.

For example, it is common in the art for ships sailing across the sea to carry large containers of LNG. When these ships reach port, the containers are off-loaded and stored until use, shipping, and/or the like. Much of the time, these containers and/or other vessels are left for extended periods of time. These extended periods of time substantially raise the costs of storage and shipping of the LNG. Solutions to the problem have generally included off-loading and/or emptying the vessels into storage caverns. However, these storage caverns require the same procedures as the caverns heretofore mentioned, such as heating, cooling, compressing, and/or the like. However, the use of embodiments of the present invention would allow for an increased efficiency of operation. By converting at least a portion of an LNG to natural gas and storing this gas in a storage facility(s) of the present invention, a portion of the cost of storage is reduced, such as refrigeration and the like. As mentioned, the shallow depth, low pressure gas storage caverns of the present invention have a high flow rate both in and out, therefore, allowing loading and unloading of an LNG vessel at a steady flow rate thus increasing operating capacity of the LNG facility(s). Further, the storage facility(s) of the present invention may be used to supply peak load demands for the LNG facility(s).

As well, other embodiments of the present invention may use a gas storage facility or facilities that is located on or near the physical location of the user, or which is directly connected to the user, for maintenance of a user's facility during an operational shutdown, whether planned or not. A gas storage facility or facilities of the present invention would provide an isolated supply of gas to the user without the necessity of connection to a gas pipeline during the operations of a shutdown, such as maintenance, connection of new units, testing, and/or the like, thereby increasing safety and reducing chances of problems commonly encountered with the use of gas from a gas pipeline.

While general embodiments have been herein shown and described various other embodiments and uses will become readily apparent to those of ordinary skill in the art and are intended to be fully covered by the following claims. For example, while gas has been referred to as a gas of use in a storage facility, any kind of gas may be used and is contemplated to be within the scope of the claims.

As to the manner of operation and use of the present invention, the same is made apparent from the foregoing discussion. With respect to the above description, it is to be realized that although dimensional embodiments of specific material is disclosed, those enabling embodiments are illustrative, and the optimum dimension relationships for the parts of the invention are to include variations in composition, form, function and manner of operation, assembly and use, which are deemed readily apparent to one skilled in the art in view of this disclosure, and all equivalent relationships to those illustrated in the drawings and encompassed in the specifications are intended to be encompassed by the present invention.

Therefore, the foregoing is considered as illustrative of the principles of the invention and since numerous modifications will readily occur to those skilled in the art, it is not desired to limit the invention to the exact construction and operation shown or described, and all suitable modifications and equivalents may be resorted to, falling within the scope of the invention.

While the foregoing is directed to various embodiments of the present invention, other and further embodiments of the invention may be devised without departing from the basic scope thereof, and the scope thereof is determined by the claims which follow.

What is claimed is:

1. A method for short term trading in gas, the method comprising the steps of:

obtaining storage rights to at least a portion of one or more low pressure underground salt formation storage facilities;

connecting a natural gas pipeline directly to the interior of the one or more low pressure underground salt formation storage facilities;

maintaining the pressure of the natural gas in the pipeline at nominally the same pressure as that of the one or more low pressure underground salt formation storage facilities, thereby allowing for flow both into the low pressure underground salt formation storage facilities from the natural gas pipeline and from the natural gas pipeline to the low pressure underground salt formation storage facilities through a single natural gas pipeline, and enabling rapid reversal of flow direction in a time less than twenty-four hours, such that when the supply of the gas is greater than the demand for the gas, a gas facility computer system configured for controlling gas flow into and out of the low pressure underground salt formation storage facilities diverts a portion of the natural gas from the natural gas pipeline to the low pressure underground salt formation storage facilities by using or creating a nominal pressure increase in the natural gas pipeline and when the demand of the natural gas is greater than the supply of the natural gas, the gas facility computer system diverts a portion of the gas from the low pressure underground salt formation storage facilities into the natural gas pipeline by using or creating a nominal pressure decrease in the natural gas of the low pressure underground salt formation storage facilities; and using a trading system configured to make short term trades related to natural gas to make at least one short term trade related to natural gas by receiving gas into or providing gas out of the one or more low pressure underground salt formation storage facilities using the gas facility computer system, wherein the trading system is operable to conduct at least one additional short term trade within a time less than twenty-four hours using the rapid reversal of flow direction.

2. The method of claim 1, wherein said short term of said at least one short term trade is less than 24 hours.

3. The method of claim 2, wherein said short term is less than 12 hours.

4. The method of claim 3, wherein said short term is less than 6 hours.

5. The method of claim 4, wherein said short term is less than one hour.

6. The method of claim 5, wherein said short term is less than thirty minutes.

7. The method according to claim 1 wherein the step of making at least one short term trade related to natural gas by using the one or more low pressure underground salt formation storage facilities comprises reversing an existing flow of gas between the pipeline and at least one of the low pressure underground salt formation storage facilities.

8. A system operable for use in short term trading in gas, said system comprising:

at least one low pressure underground salt formation storage;

a natural gas pipeline directly connected with the at least one low pressure underground salt formation storage facility having natural gas therein at a pressure nominally the same as the pressure of natural gas stored in the at least one low pressure underground salt formation storage facility, allowing for flow both into the at least one low pressure underground salt formation storage facility from the natural gas pipeline and from the natural gas pipeline to the at least one low pressure underground salt formation storage facility through a single natural gas pipeline, and enabling rapid reversal of flow direction in a time less than twenty-four hours;

a gas facility computer system operable for controlling gas flow into and out of said at least one low pressure underground salt formation storage facility on a short term basis by compressing or decompressing natural gas in the pipeline to cause diversion of the portion of the natural gas to or from the storage facility, such that when the supply of the gas is greater than the demand for the gas, the gas facility computer system diverts a portion of the natural gas from the natural gas pipeline to the at least one low pressure underground salt formation, and when the demand of the natural gas is greater than the supply of the natural gas, the gas facility computer system diverts a portion of the natural gas from the at least one low pressure underground salt formation to the natural gas pipeline; and a trading system configured to make at least one short term trade related to natural gas by receiving gas into or providing gas out of the at least one low pressure underground salt formation storage facility using the gas facility computer system, wherein the trading system is operable to conduct at least one additional short term trade within a time less than twenty-four hours using the rapid reversal of flow direction.

* * * * *